United States Patent
Hoshino

(10) Patent No.: US 6,701,458 B1
(45) Date of Patent: Mar. 2, 2004

(54) PROGRAM STARTER SYSTEM, AND METHOD OF CONTROLLING PROGRAM STARTUP

(75) Inventor: Masaru Hoshino, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 439 days.

(21) Appl. No.: 09/635,405

(22) Filed: Aug. 10, 2000

(30) Foreign Application Priority Data

Aug. 10, 1999 (JP) ............................................ 11-226301
Aug. 3, 2000 (JP) ...................................... 2000-235488

(51) Int. Cl.[7] .................................................. H02H 3/05
(52) U.S. Cl. .......................................... 714/36; 714/38
(58) Field of Search ............................. 714/36, 37, 38; 717/100, 174, 176, 124, 127, 128

(56) References Cited

U.S. PATENT DOCUMENTS

| | | | | |
|---|---|---|---|---|
| 5,355,353 A | * | 10/1994 | Kaiho | ..................... 369/13.02 |
| 5,835,765 A | * | 11/1998 | Matsumoto | ................. 709/102 |
| 6,088,507 A | * | 7/2000 | Yamauchi et al. | ............ 386/95 |
| 6,108,486 A | * | 8/2000 | Sawabe et al. | ............... 386/98 |
| 6,202,121 B1 | * | 3/2001 | Walsh et al. | ................ 711/100 |
| 6,405,362 B1 | * | 6/2002 | Shih et al. | .................. 717/174 |

FOREIGN PATENT DOCUMENTS

| | | |
|---|---|---|
| JP | 8-286925 | 11/1996 |
| JP | 11-78131 | 3/1999 |

* cited by examiner

Primary Examiner—Dieu-Minh Le
(74) Attorney, Agent, or Firm—Sughrue Mion, PLLC

(57) ABSTRACT

A utility program continuously monitors a data acquisition section into which an auxiliary recording medium is removably inserted, thus detecting an auxiliary recording medium connected to the data acquisition section (S10 to S40). When the auxiliary recording medium is inserted into the data acquisition section, the utility program identifies an identifier of a data file recorded in the auxiliary recording medium (S50 and S60). The utility program starts an application program which has been related to the identifier beforehand (S70 and S80). Therefore, no complicated operations are required until the time an application program for processing a data file recorded on an auxiliary recording medium is started.

31 Claims, 4 Drawing Sheets

PROGRAM STARTER SYSTEM, AND METHOD OF CONTROLLING PROGRAM STARTUP

BACKGROUND OF INVENTION

1. Field of Invention

The present invention relates to a program starter system and a program startup control method, which are applied to a data processing system whose core resides in a computer. More particularly, the present invention relates to a program starter system which activates a specific application program when a recording medium is inserted into a data acquisition section, as well as to a corresponding program startup control method.

2. Related Art

In accordance with a recent improvement in the performance of a digital camera, increasing demand exists for upgrading from a film camera to a digital camera. The user of a digital camera loads photographed images into a personal computer and can appreciate the images on a monitor. So long as an image loaded into a personal computer is printed through use of a printer, the user can appreciate a photographed image on paper, as in the case of a conventional chemically-developed photograph. In a case where images photographed by a digital camera are printed through use of a printer, image data recorded on a recording medium, such as a memory card, are loaded into a personal computer and are printed by means of activation of an image editing application program.

Typical procedures for printing image data will now be described.

First, a predetermined image editing application program is started by a personal computer. A recording medium is inserted into a data acquisition section, such as a card reader, connected to the personal computer. An image file recorded on the recording medium is loaded into a storage device of the personal computer by means of designating a directory. The user directs printing of the image file through use of an image editing application program, thereby invoking a printer driver. The user sets paper size, the type of paper, and print quality on a setting screen of the printer driver, wherewith a printing operation is commenced. So long as an extension of an image data file has been related to an image editing application program beforehand, the image editing application program can be invoked without involvement of a necessity for specifying an image editing application program every time.

As mentioned above, during operations for printing, through use of a printer connected to a personal computer, the image that has been photographed by a digital camera, the user must enter commands to the personal computer step by step. Such complicated input operations are responsible for making some users reluctant to use a digital camera. Consequently, there is a desire for embodying means which enables easy printing of an image photographed by a digital camera with involvement of only a few procedures.

SUMMARY OF INVENTION

The present invention has been conceived in light of such a demand and is aimed at providing a program starter system which facilitates processing of the data recorded on a recording medium, as well as a corresponding program startup control method.

In a program starter system according to the present invention, a data acquisition section is removably connected to an auxiliary recording medium and reads data stored in the auxiliary recording medium. Monitoring means monitors the data acquisition section and detects the auxiliary recording medium connected to the data acquisition section. Determination means determines an identifier of a data file recorded in the detected auxiliary recording medium. Starting means starts an application program which has already been related to the identifier. Thus, no operation is needed from the time a recording medium is connected to a data acquisition section until the time an application program for processing a data file recorded on the recording medium is started. Consequently, the program starter system according to the present invention facilitates processing of the data recorded on the auxiliary recording medium.

Preferably, the monitoring means monitors the data acquisition section at predetermined intervals while the data acquisition section is being energized. Therefore, a specific application program can be started substantially simultaneously with connection of a recording medium to a data acquisition section.

Preferably, the starting means relates an identifier of an image data file with an application program which displays, on a display unit and in the form of a list, thumbnail image data belonging to an image data file recorded in the auxiliary recording medium. When an auxiliary recording medium having an image data file recorded thereon is connected to a data acquisition section, details of the image data file recorded on the auxiliary recording medium are displayed in the form of a list on a display unit. Therefore, the user can readily ascertain details of the data recorded on the auxiliary recording medium.

Preferably, the starting means relates an identifier of an image data file with an application program which sets print conditions with regard to image data recorded in the auxiliary recording medium. When an auxiliary recording medium having an image data file recorded thereon is connected to a data acquisition section, print conditions can be set with respect to image data. Accordingly, the user can readily print the image data recorded on the auxiliary recording medium.

Preferably, the starting means relates an identifier of an image data file with an application program which displays, on a display unit and in the form of a list, thumbnail image data belonging to an image data file recorded in the auxiliary recording medium and which sets printing conditions with regard to primary image data belonging to the image data file recorded in the auxiliary recording medium. Accordingly, when an auxiliary recording medium having image data files recorded thereon is connected to a data acquisition section, details of the image data files recorded on the auxiliary recording medium are displayed in the form of a list by virtue of thumbnail image data, and print conditions can be collectively set with regard to primary image data. Consequently, the user can readily set print conditions without involvement of a necessity of opening image data files recorded on the auxiliary recording medium one by one.

Preferably, the starting means relates an identifier of an image data file with an application program which copies an image data file recorded on the auxiliary recording medium to another auxiliary recording medium. When an auxiliary recording medium having an image data file recorded thereon is connected to a data acquisition section, the image data file recorded on the auxiliary recording medium can be copied to another auxiliary recording medium. Consequently, the user can readily copy the image data file recorded on the auxiliary recording medium to another auxiliary recording medium.

Preferably, under the program startup control method according to the present invention, the data acquisition section is monitored, and a recording medium connected to the data acquisition section is detected. Further, an identifier of a data file recorded in the detected auxiliary recording medium is determined, to thereby start an application program which has already been related to the identifier. Thus, no operation is needed from the time a recording medium is connected to a data acquisition section until the time an application program for processing a data file recorded on the recording medium is started. Consequently, the program startup control method according to the present invention facilitates processing of the data recorded on the auxiliary recording medium.

Preferably, during the monitor and detection step, the data acquisition section is monitored at predetermined intervals while the data acquisition section is being energized. Therefore, a specific application program can be started substantially simultaneously with connection of a recording medium to a data acquisition section.

Preferably, during the starting step, an identifier of an image data file is related with an application program which displays, on a display unit and in the form of a list, thumbnail image data belonging to an image data file recorded in the auxiliary recording medium. When an auxiliary recording medium having an image data file recorded thereon is connected to a data acquisition section, details of the image data file recorded on the auxiliary recording medium are displayed in the form of a list on a display unit. Therefore, the user can readily ascertain details of the data recorded on the auxiliary recording medium.

Preferably, during the starting step, an identifier of an image data file is related with an application program which sets print conditions with regard to image data recorded in the auxiliary recording medium. When an auxiliary recording medium having an image data file recorded thereon is connected to a data acquisition section, print conditions can be set with respect to image data. Accordingly, the user can readily print the image data recorded on the auxiliary recording medium.

Preferably, during the starting step, an identifier of an image data file is related with an application program which displays, on a display unit and in the form of a list, thumbnail image data belonging to an image data file recorded in the auxiliary recording medium and which sets print conditions with regard to primary image data belonging to the image data file recorded in the auxiliary recording medium. Accordingly, when an auxiliary recording medium having image data files recorded thereon is connected to a data acquisition section, details of the image data files recorded on the auxiliary recording medium are displayed in the form of a list by virtue of thumbnail image data, and print conditions can be collectively set with regard to primary image data. Consequently, the user can readily set print conditions without involvement of a necessity of opening image data files recorded on the auxiliary recording medium one by one.

Preferably, during the starting step, an identifier of an image data file is related with an application program which copies an image data file recorded on the auxiliary recording medium to another auxiliary recording medium. When an auxiliary recording medium having an image data file recorded thereon is connected to a data acquisition section, the image data file recorded on the auxiliary recording medium can be copied to another auxiliary recording medium. Consequently, the user can readily copy the image data file recorded on the auxiliary recording medium to another auxiliary recording medium.

The present invention also provides a printer for use in the foregoing program starter system or for use with the foregoing program startup control method, the printer comprising the data acquisition section. Since the printer has a data acquisition section, when a recording medium is inserted into the data acquisition section of the printer, the program starter system activates an application program for processing a data file recorded on the recording medium. Consequently, in a case where a system is configured such that a printer has a reader for reading, for example, a memory card which is removably attached to a digital camera and such that a host computer starts an application program for processing an image file, there can be embodied a program starter system which facilitates starting of an application program for processing an image file and printing of the image file through use of the application program.

DETAILED DESCRIPTION OF PREFERRED EMBODIMENTS

An embodiment of the present invention will be described hereinbelow by reference to the drawings.

Figure 2:
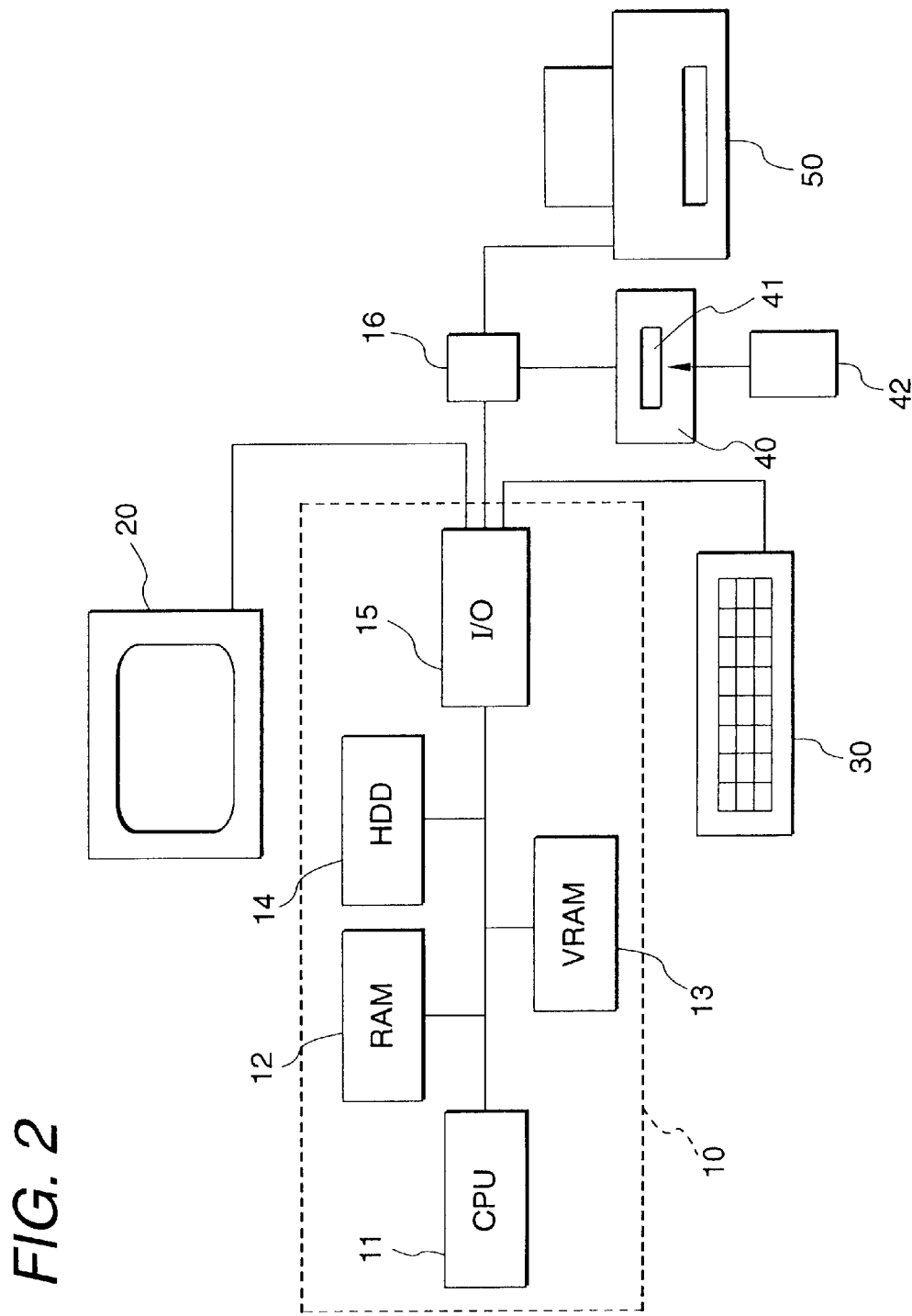
FIG. 2 is a block diagram showing the hardware configuration of a print system according to one embodiment.

First, the hardware configuration of a print system using a program starter system according to one embodiment of the present invention will now be described by reference to FIG. 2. The print system comprises a control section 10, a monitor 20 serving as a display unit for displaying outputs from the control section 10, a keyboard 30 for entering a command to the control section 10, a card reader 40 serving as a data acquisition section for entering data into the control section 10, and a printer 50 for printing outputs from the control section 10.

The control section 10 serves as a personal computer comprising, as input/output devices, the monitor 20, the keyboard 30, the card reader 40, and the printer 50. A CPU (Central Processing Unit) 11 loads a program from RAM (Random Access Memory) 12, thus executing an operating system or an application program. The RAM 12 is a readable/writable primary storage device for storing a program and data processed by the program. A magnetic disk drive 14 is a bulk storage auxiliary storage device for storing the data to be loaded into the RAM 12. The magnetic disk drive 14 incorporates a magnetic disk which serves as another auxiliary recording medium described in claims. VRAM (Video RAM) 13 stores data to be displayed on a monitor 20. An interface 15 interconnects the monitor 20, the keyboard 30, the card reader 40, the printer 50, and the control section 10. The card reader 40 and the printer 50 are connected to the control section 10 by way of a universal serial bus (USB) and a hub 16. In the present embodiment, the card reader 40 is housed in one housing, and the printer 50 is housed in another housing. Alternatively, the card reader 40 and the printer 50 may be housed in a single housing together with the hub 16. Further, the card reader 40 and the control section 10 may be housed in a single housing.

The card reader 40 has a card slot 41 to which a compact flash memory card 42 serving as an auxiliary recording medium is removably connected. The data stored in the compact flash memory card 42 are read by the card reader 40, and the thus-read data are transferred to the control section 10 by way of the hub 16.

Figure 3:
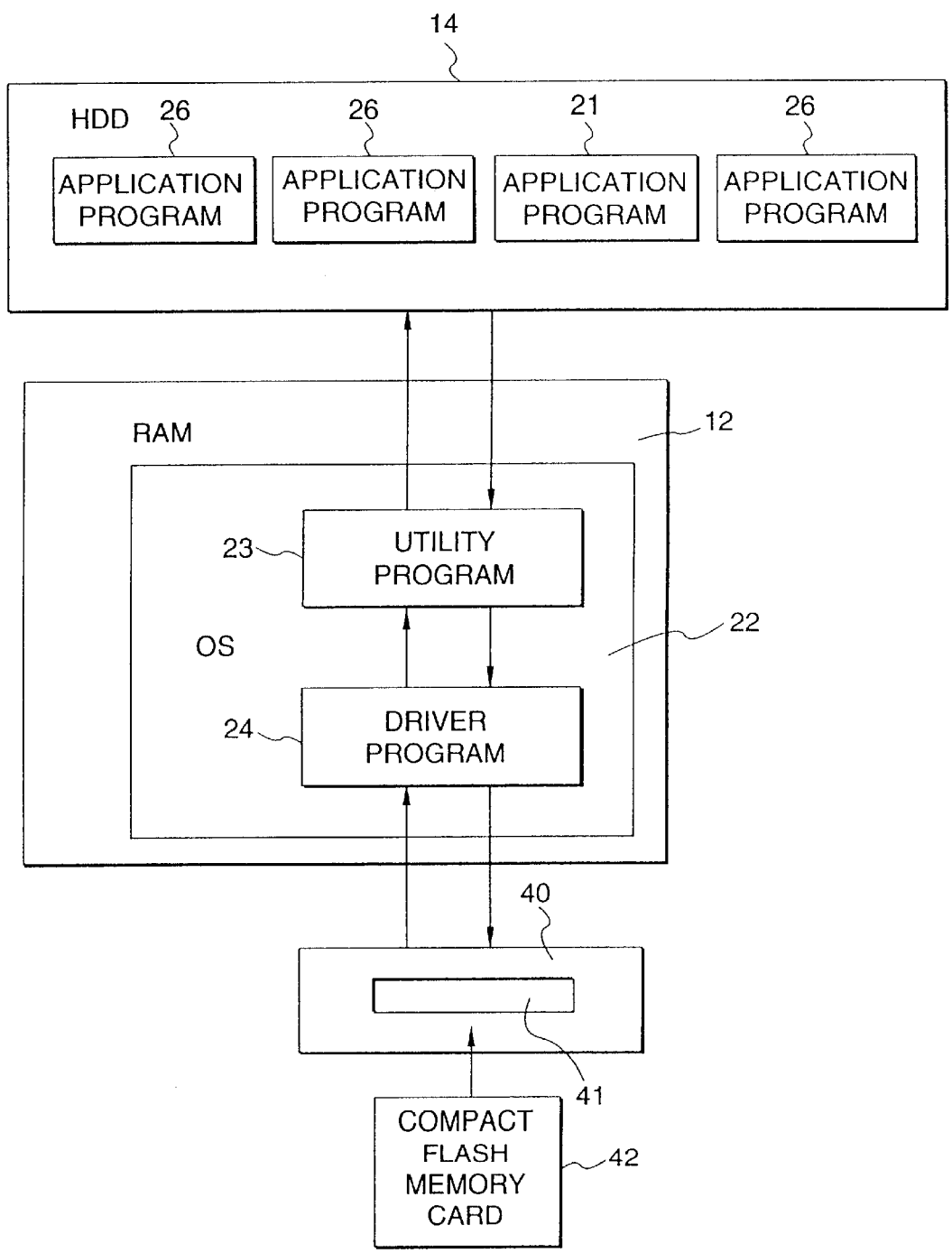
FIG. 3 is a block diagram showing the software configuration of a print system according to one embodiment.
Figure 4:
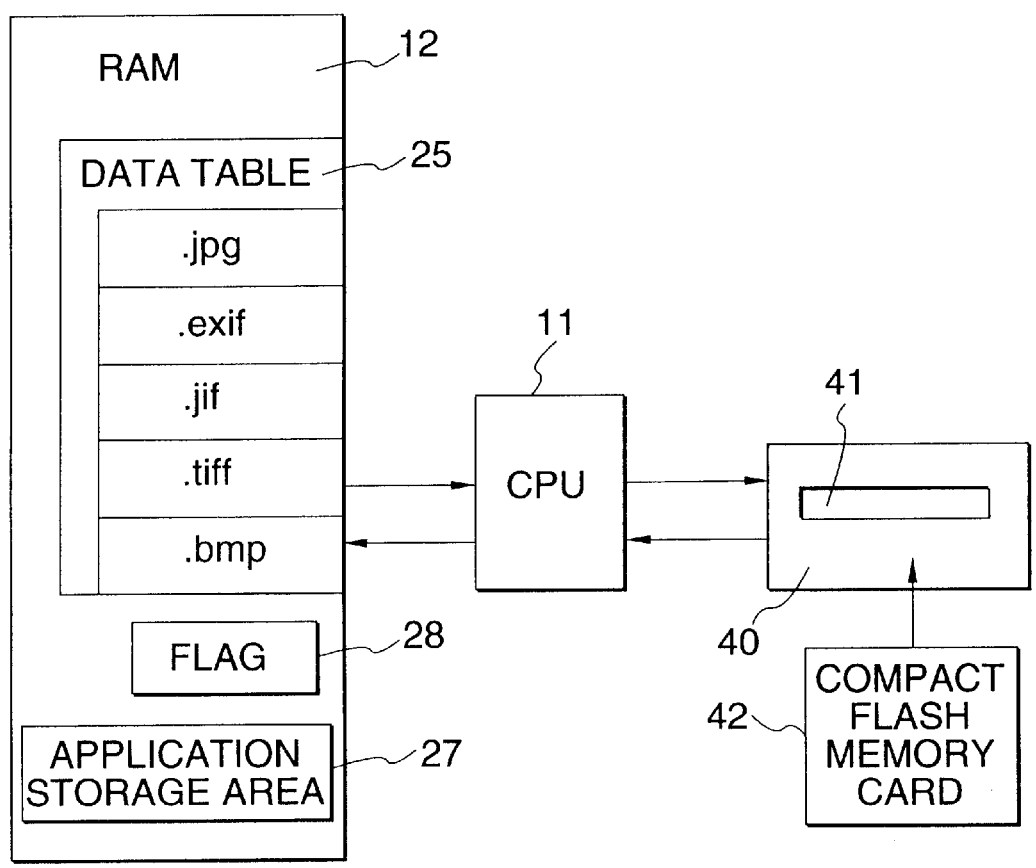
FIG. 4 is a block diagram showing a program starter control system for use with a print system according to one embodiment.

The configuration of software for use with the print system according to the present embodiment will be described by reference to FIGS. 3 and 4. FIG. 3 shows the configuration of software for use with a program startup control system employed in the print system. When the control section 10 is started, an operating system 22 is loaded into the RAM 12. The operating system 22 controls the overall print system. Various programs stored in the magnetic disk drive 14, such as a driver program 24 for controlling the card reader 40, are invoked by the operating system 22, and the thus-invoked programs are resident in the RAM 12. Further, a utility program 23 constituting monitoring means and startup means is resident in the RAM 12.

Various application programs 24 are stored in the magnetic disk drive 14, and an application program 21 which provides at least the following features is stored in the magnetic disk drive 14.

(1) Thumbnail image data belonging to an image data file contained in a predetermined directory are loaded into the RAM 12, and on the basis of thumbnail image data, details of the image data file contained in the directory are displayed in the form of a table.

(2) With regard to an individual image data file whose details are displayed by virtue of feature (1), an operator selects print conditions. The print condition selected by the operator in connection with an individual image data file are collectively transferred to a printer driver program, as conditions for printing main image data of the image data file.

(3) An image data file is copied to the directory selected by the operator.

Respective features (1), (2), and (3) are implemented by sub-programs integrated by a single main program. As will be described later, the application program 21 is automatically started when the compact flash memory 42 having an image data file recorded thereon is connected to the card slot 41. Consequently, the user can readily know the nature of the image data files stored in the compact flash memory card 42. Further, the recorded image data files can be readily printed or copied.

The utility program 23 is resident in the RAM 12 and inquires of the driver program 24 at predetermined intervals whether the compact flash memory card 42 is connected to the card slot 41, thus continuously monitoring the card reader 40. As shown in FIG. 4, within the RAM 12 reside the utility program 23, which ensures a flag 28 which is set to an ON state when the compact flash memory card 42 is connected to the card slot 41; a data table 24 in which a plurality of extensions are registered as identifiers; and an application storage area 27 in which a specific application program to be started by the utility program 23 is registered. In the case of the present embodiment, the application program 21 is registered in the application storage area 27. Further, extensions of image data files to be processed by the application program 21; that is, ".jpg," ".exif," ".jif," ".tiff," ".bmp," or the like are registered in the data table 25. The extensions to be registered in the data table 25 and the application programs to be registered in the application storage area 27 may be registered beforehand at the time of shipment from a factory. Alternatively, the extensions and application programs may be registered by an operator.

When the compact flash memory card 42 is connected to the card slot 41, the utility program 23 inquires of the driver program 24 about the nature of extensions of data files stored in the compact flash memory card 42. The utility program 23 determines whether or not an extension which is not registered in the data table 25 is included in the received extensions. If all the received extensions are determined to be registered in the data table 25, the application program 21 registered in the application storage area 27 is activated after having been loaded into the RAM 12 from the magnetic disk drive 14.

Figure 1:
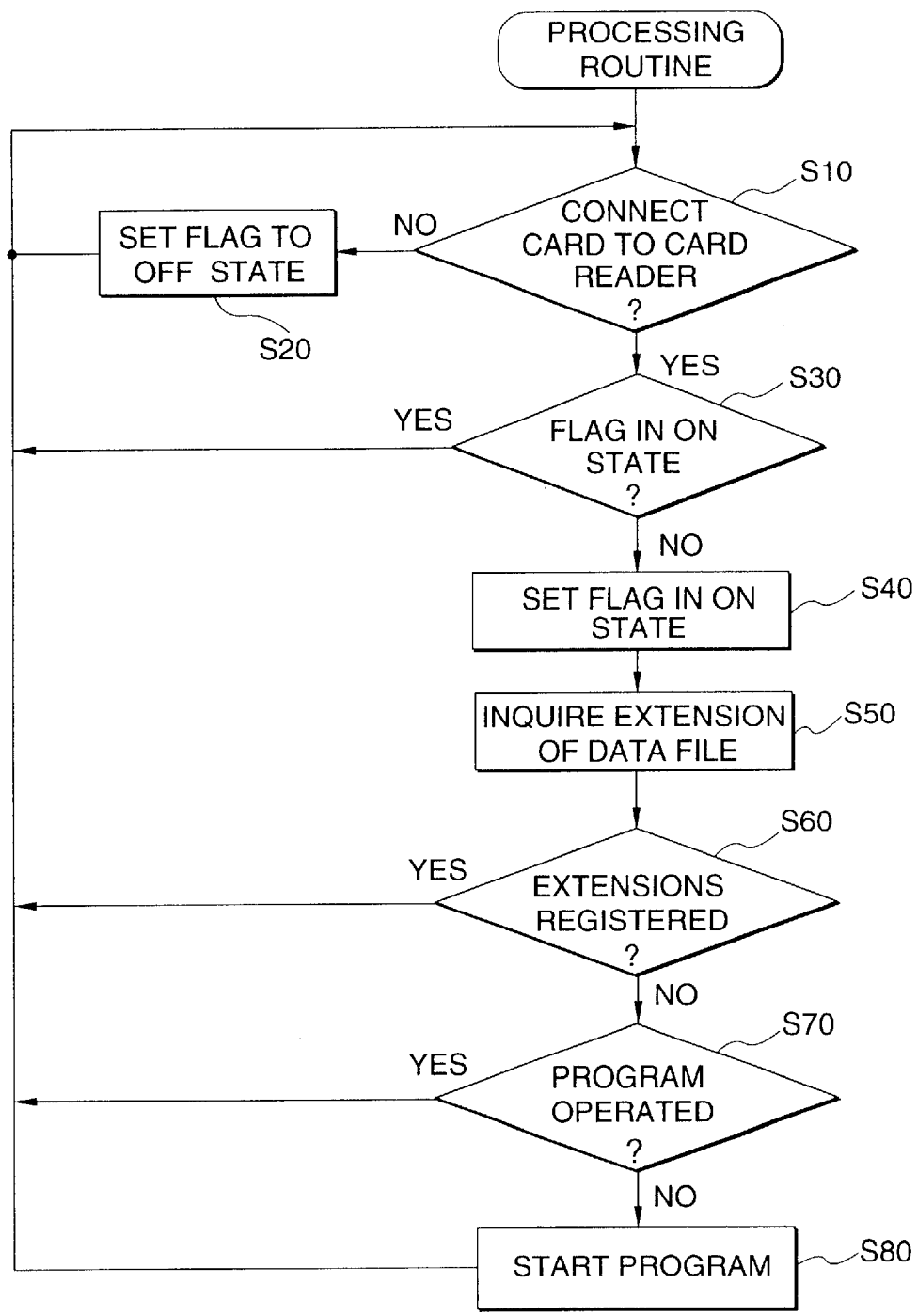
FIG. 1 is a flowchart showing a program startup control method for use with a print system according to one embodiment of the present invention.

A program startup control method for use with the print system according to the present embodiment will be described according to a flowchart shown in FIG. 1.

The utility program 23 is resident in the RAM 12 and inquires of the driver program 24 at predetermined intervals, by way of the operating system 22, whether or not the compact flash memory card 42 is connected to the card slot 41 (step S10). In a case where a compact flash memory card 42 is not connected to the card slot 41 at the time of inquiry, the flag 28 is maintained in an OFF state (step S20). In contrast, if the compact flash memory card 42 is connected to the card slot 41 at the time of inquiry, a determination is made as to whether the flag 28 is in an ON state or an OFF state (step S30). If the flag 28 is in an OFF state, the flag 28 is set to an ON state (step S40). In contrast, if the flag 28 is in an ON state, processing operations pertaining to steps S10 and S30 are iterated until the flag 28 is set to an OFF state. These processing operations (pertaining to steps S10 to S40) correspond to a data acquisition section monitoring function of the print system. The reason why processing operations pertaining to steps S10 and S30 are iterated until the flag 28 is set to an OFF state is to prevent overlapping activation of the application program 21.

The utility program 23 inquires of the driver program 24 about the nature of the data files stored in the compact flash memory card 42, by way of the operating system 22 (step S50). Upon receipt of such an inquiry, the driver program 24 scans a table regarding volumes in the compact flash memory card 42 to the utility program 23 and transmits extensions of data files of all types stored in the compact flash memory card 42. The utility program 23 that has received the extensions of the data files sequentially determines the received extensions whether or not an extension which is not registered in the data table 25 is included in the received extensions (step S60). If all the received extensions are determined to be registered in the data table 25, the utility program 23 inquires of the operating system 22 whether or not the application program 21 is in operation (step S70). If the application program 21 is not in operation, the application program 21 is loaded into the RAM 12 from the magnetic disk drive 14 and is activated (step S80). If the application program 21 has already been in operation, processing returns to step S10 and a round of processing operations are iterated, as will be described later. The processing operations (pertaining to steps S50 to S80) correspond to a program startup function of the print system.

While the application program 21 is in operation, the utility program 24 inquires of the driver program 24 at predetermined intervals whether or not the compact flash memory card 42 is connected to the card slot 41 (step S10). If the compact flash memory card 42 is determined to be inserted into the card slot 41, the utility program 23 determines whether or not the flag 28 is in an ON or OFF state (step S30). Unless the compact flash memory card 42 is removed from the card slot 41, the flag 28 is maintained in an ON state, and the utility program 23 continuously iterates a loop between steps S10 and S30. Consequently, there is prevented overlapping startup of the application program 21 that is already in operation.

Since an inquiry is made in step S70 as to whether or not the application program 21 is already in operation, overlapping startup of the application program 21 is prevented even in a case where the application program 21 has already been started before the compact flash memory card 42 is connected to the card slot 41.

It is not easy for a user who is not familiar with computer operations to grasp which application program performs a desired operation and to start the application program. In the present embodiment, the application program 21 is started only by means of the compact flash memory card 42 having image data files recorded thereon being connected to the card slot 41. Consequently, an operation for starting a specific application program can be simplified. Particularly, the present invention obviates a necessity for specifying an application program corresponding to a data file and specifying a directory which contains the application program. By means of only the compact flash memory card 42 in which data files to be processed are recorded being connected to the card slot 41, a desired operation can be commenced. Thus, an application program is started very easily.

What is claimed is:

1. A program starter system comprising:
    a data acquisition section removably connected to an auxiliary recording medium and reading data stored in the auxiliary recording medium;
    monitoring means monitoring the data acquisition section and detecting the auxiliary recording medium connected to the data acquisition section; and
    starting means for determining an identifier of a data file recorded in the detected auxiliary recording medium and starting an application program which has already been related to the identifier.

2. The program starter system as defined in claim 1, wherein the monitoring means monitors the data acquisition section at predetermined intervals while the data acquisition section is being energized.

3. The program starter system as defined in claim 1, wherein the starting means relates an identifier of an image data file with an application program which displays, on a display unit and in the form of a list, thumbnail image data belonging to an image data file recorded in the auxiliary recording medium.

4. The program starter system as defined in claim 2, wherein the starting means relates an identifier of an image data file with an application program which displays, on a display unit and in the form of a list, thumbnail image data belonging to an image data file recorded in the auxiliary recording medium.

5. The program starter system as defined in claim 1, wherein the starting means relates an identifier of an image data file with an application program which sets printing conditions with regard to image data recorded in the auxiliary recording medium.

6. The program starter system as defined in claim 2, wherein the starting means relates an identifier of an image data file with an application program which sets printing conditions with regard to image data recorded in the auxiliary recording medium.

7. The program starter system as defined in claim 1, wherein the starting means relates an identifier of an image data file with an application program which displays, on a display unit and in the form of a list, thumbnail image data belonging to an image data file recorded in the auxiliary recording medium and which sets printing conditions with regard to primary image data belonging to the image data file recorded in the auxiliary recording medium.

8. The program starter system as defined in claim 2, wherein the starting means relates an identifier of an image data file with an application program which displays, on a display unit and in the form of a list, thumbnail image data belonging to an image data file recorded in the auxiliary recording medium and which sets printing conditions with regard to primary image data belonging to the image data file recorded in the auxiliary recording medium.

9. The program starter system as defined in claim 1, wherein the starting means relates an identifier of an image data file with an application program which copies an image data file recorded on the auxiliary recording medium to another auxiliary recording medium.

10. The program starter system as defined in claim 2, wherein the starting means relates an identifier of an image data file with an application program which copies an image data file recorded on the auxiliary recording medium to another auxiliary recording medium.

11. A program startup control method for use in a data processing system having a data acquisition section which is removably connected to an auxiliary recording medium and reads data stored in the auxiliary recording medium, the method comprising:
    monitoring the data acquisition section and detecting a recording medium connected to the data acquisition section; and
    determining an identifier of a data file recorded in the detected auxiliary recording medium; and
    starting an application program which has already been related to the identifier.

12. The program startup control method as defined in claim 11, wherein, in the monitoring step, the data acquisition section is monitored at predetermined intervals while the data acquisition section is being energized.

13. The program startup control method as defined in claim 11, wherein, in the starting step, an identifier of an image data file is related with an application program which displays, on a display unit and in the form of a list, thumbnail image data belonging to an image data file recorded in the auxiliary recording medium.

14. The program startup control method as defined in claim 12, wherein, in the starting step, an identifier of an image data file is related with an application program which displays, on a display unit and in the form of a list, thumbnail image data belonging to an image data file recorded in the auxiliary recording medium.

15. The program startup control method as defined in claim 11, wherein, in the starting step, an identifier of an image data file is related with an application program which sets printing conditions with regard to image data recorded in the auxiliary recording medium.

16. The program startup control method as defined in claim 12, wherein, in the starting step, an identifier of an image data file is related with an application program which sets printing conditions with regard to image data recorded in the auxiliary recording medium.

17. The program startup control method as defined in claim 11, wherein, in the starting step, an identifier of an image data file is related with an application program which displays, on a display unit and in the form of a list, thumbnail image data belonging to an image data file recorded in the auxiliary recording medium and which sets printing conditions with regard to primary image data belonging to the image data file recorded in the auxiliary recording medium.

18. The program startup control method as defined in claim 12, wherein, in the starting step, an identifier of an image data file is related with an application program which displays, on a display unit and in the form of a list, thumbnail image data belonging to an image data file recorded in the auxiliary recording medium and which sets printing conditions with regard to primary image data belonging to the image data file recorded in the auxiliary recording medium.

19. The program startup control method as defined in claim 11, wherein, in the starting step, an identifier of an image data file is related with an application program which copies an image data file recorded on the auxiliary recording medium to another auxiliary recording medium.

20. The program startup control method as defined in claim 12, wherein, in the starting step, an identifier of an image data file is related with an application program which copies an image data file recorded on the auxiliary recording medium to another auxiliary recording medium.

21. A printer for use in the program starter system as defined in claim 1 or with the program startup control method as defined in claim 11.

22. A program starter system comprising:
 a recording medium reader removably connected to an auxiliary recording medium which reads data stored in the auxiliary recording medium;
 a monitoring circuit which monitors the recording medium reader and detects the auxiliary recording medium connected to the recording medium reader; and
 a control circuit which determines an identifier of a data file recorded in the detected auxiliary recording medium and starts an application program which has already been related to the identifier.

23. The program starter system as defined in claim 22, wherein the monitoring circuit monitors the recording medium reader at predetermined intervals while the recording medium reader is being energized.

24. The program starter system as defined in claim 22, wherein the control circuit relates an identifier of an image data file with an application program which displays, on a display unit and in the form of a list, thumbnail image data belonging to an image data file recorded in the auxiliary recording medium.

25. The program starter system as defined in claim 23, wherein the control circuit relates an identifier of an image data file with an application program which displays, on a display unit and in the form of a list, thumbnail image data belonging to an image data file recorded in the auxiliary recording medium.

26. The program starter system as defined in claim 22, wherein the control circuit relates an identifier of an image data file with an application program which sets printing conditions with regard to image data recorded in the auxiliary recording medium.

27. The program starter system as defined in claim 23, wherein the control circuit relates an identifier of an image data file with an application program which sets printing conditions with regard to image data recorded in the auxiliary recording medium.

28. The program starter system as defined in claim 22, wherein the control circuit relates an identifier of an image data file with an application program which displays, on a display unit and in the form of a list, thumbnail image data belonging to an image data file recorded in the auxiliary recording medium and which sets printing conditions with regard to primary image data belonging to the image data file recorded in the auxiliary recording medium.

29. The program starter system as defined in claim 23, wherein the control circuit relates an identifier of an image data file with an application program which displays, on a display unit and in the form of a list, thumbnail image data belonging to an image data file recorded in the auxiliary recording medium and which sets printing conditions with regard to primary image data belonging to the image data file recorded in the auxiliary recording medium.

30. The program starter system as defined in claim 22, wherein the control circuit relates an identifier of an image data file with an application program which copies an image data file recorded on the auxiliary recording medium to another auxiliary recording medium.

31. The program starter system as defined in claim 23, wherein the control circuit relates an identifier of an image data file with an application program which copies an image data file recorded on the auxiliary recording medium to another auxiliary recording medium.

\* \* \* \* \*